United States Patent [19]

Michiharu

[11] Patent Number: 4,540,319

[45] Date of Patent: Sep. 10, 1985

[54] DRILLING DEVICE FOR REMOVING A SPOT-WELDED PORTION

[75] Inventor: Tsukai Michiharu, 52, Kasugacho 6-chome, Fukuyama-shi, Hiroshima-ken, Japan

[73] Assignees: Michiharu Tsukai, Hiroshima; Maeda Kiko Company Limited, Osaka, both of Japan

[21] Appl. No.: 412,971

[22] Filed: Aug. 27, 1982

[51] Int. Cl.³ .......... B23B 45/14

[52] U.S. Cl. .......... 408/100; 408/111; 408/141; 408/202

[58] Field of Search .......... 406/712, 99, 87, 101, 406/136, 129, 141, 111, 103, 14; 409/178, 181, 182, 185

[56] References Cited

U.S. PATENT DOCUMENTS

| | | | |
|---|---|---|---|
| 2,642,760 | 6/1953 | Goldberg | 408/99 |
| 2,860,531 | 11/1958 | Groff | 408/111 X |
| 3,089,357 | 5/1963 | Grau | 408/712 X |
| 3,620,634 | 11/1971 | Sullivan | 408/82 |
| 3,620,636 | 11/1971 | Godard | 408/141 |
| 3,640,635 | 2/1972 | Von Hollen | 408/101 |
| 3,779,663 | 12/1973 | Ruggles | 408/113 |
| 4,115,017 | 9/1978 | Wilhelmsson | 408/141 |
| 4,362,444 | 12/1982 | Watkins | 408/14 X |
| 4,405,267 | 9/1983 | Stoken | 408/101 |
| 4,418,767 | 12/1983 | Vindez | 408/14 X |

FOREIGN PATENT DOCUMENTS

| | | | |
|---|---|---|---|
| 250652 | 1/1964 | Australia | 408/100 |
| 2518379 | 11/1976 | Fed. Rep. of Germany | 408/141 |
| 2652930 | 5/1978 | Fed. Rep. of Germany | 408/129 |
| 605902 | 6/1926 | France | 408/103 |
| 568228 | 3/1945 | United Kingdom | 408/100 |

*Primary Examiner*—William R. Briggs
*Assistant Examiner*—Glenn L. Webb
*Attorney, Agent, or Firm*—Wenderoth, Lind & Ponack

[57] ABSTRACT

A drilling device for removing a spot-welded portion includes a main body casing having a chuck receiving holder, a U-shaped arm one an end of which is connected to a side portion of the chuck receiving holder, a grip handle pivotally connected to a base shoulder portion of the U-shaped arm, a chuck thrusting arm mounted integrally at an end of the grip handle, and a chuck having a drill fixed thereof, the drill facing a free end of the U-shaped arm, and a chuck receiver for receiving the chuck and slidably inserted into the main body casing. The chuck is rotated and projected in the direction toward the free end of the U-shaped arm by movement of the chuck receiver upon depression of the grip handle, the force of which is transmitted via the chuck thrusting arm. The drilling device further includes a projection amount adjusting screw for adjusting the amount of projection of the chuck.

4 Claims, 4 Drawing Figures

DRILLING DEVICE FOR REMOVING A SPOT-WELDED PORTION

BACKGROUND OF THE INVENTION

1. Field of the Invention

The present invention relates to a drilling device used exclusively for removal of spot-welded portions in a sheet metal working operation.

2. Description of the Prior Art

At present, rationalization for a variety of processes has been under way through extensive use of various devices. However, in certain industries, there are still some operations which have not been rationalized as yet. For example, in an operation for replacing a panel of a motor vehicle, which requires a considerable amount of sheet metal work, conventional practice has been such that spot-welded portions are drilled or ground by the use of a straight fluted drill or a candle-like edge drill. The known practices as described above, however, are very inefficient in operation, thus requiring considerable skill and time.

The object of the present invention is to provide a drilling device for the purpose of carrying out drilling operations during removal of spot-welded portions in an efficient manner, with simultaneous saving of labor.

SUMMARY OF THE INVENTION

To accomplish the foregoing object, there is provided a drilling device for removing a spot-welded portion which comprises a main body casing having a chuck receiving holder fixed rigidly to an end of the main body casing, a U-shaped arm, an end of which is connected to a side portion of the chuck receiving holder, a grip handle pivotally connected to a base shoulder portion of the U-shaped arm via a pivot pin, a chuck thrusting arm mounted integrally at an end of the grip handle, a chuck having a drill fixed at a free end thereof, the drill facing a free end of the U-shaped arm, a chuck receiver for receiving the chuck and slidably inserted into the main body casing, and a motor for rotating the chuck via a rotary shaft. The chuck is rotated and projected in a direction toward the free end of the U-shaped arm by movement of the chuck receiver upon depression of the grip handle, the force of which is transmitted via the chuck thrusting arm. The drilling device further comprises a projection amount adjusting screw provided at an upper back portion of the grip handle for adjusting the amount of projection of the chuck. The device is also provided with a plate thickness adjusting screw fixed at the free end of the U-shaped arm so as to face the tip portion of the drill.

According to the present invention, any damage to a plate which is not required to be separated may be perfectly prevented. Furthermore, not only is the position to be drilled correctly grasped by the employment of the U-shaped arm, but also the cutting edge of the drill is stable without slipping, thus resulting in a prolonged service life of the drill. Therefore, the device of the present invention readily can be used, even by beginners, with safety of operation, and thus, contributes to an improvement of working efficiency to an extremely large extent.

BRIEF DESCRIPTION OF THE DRAWINGS

Hereinbelow, one preferred embodiment according to the present invention will be described in detail with reference to the accompanying drawings, in which.

DETAILED DESCRIPTION OF THE INVENTION

Figure 1:
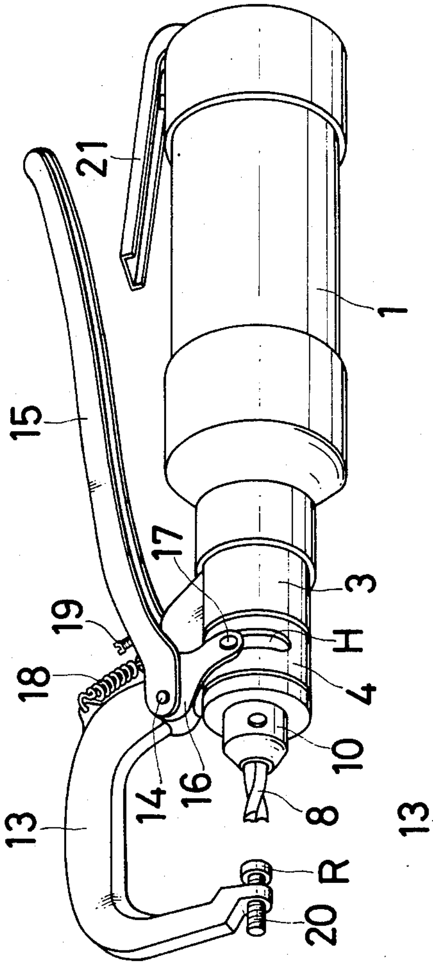
FIG. 1 is a perspective view showing an entire construction of a drilling device according to the present invention.
Figure 3:
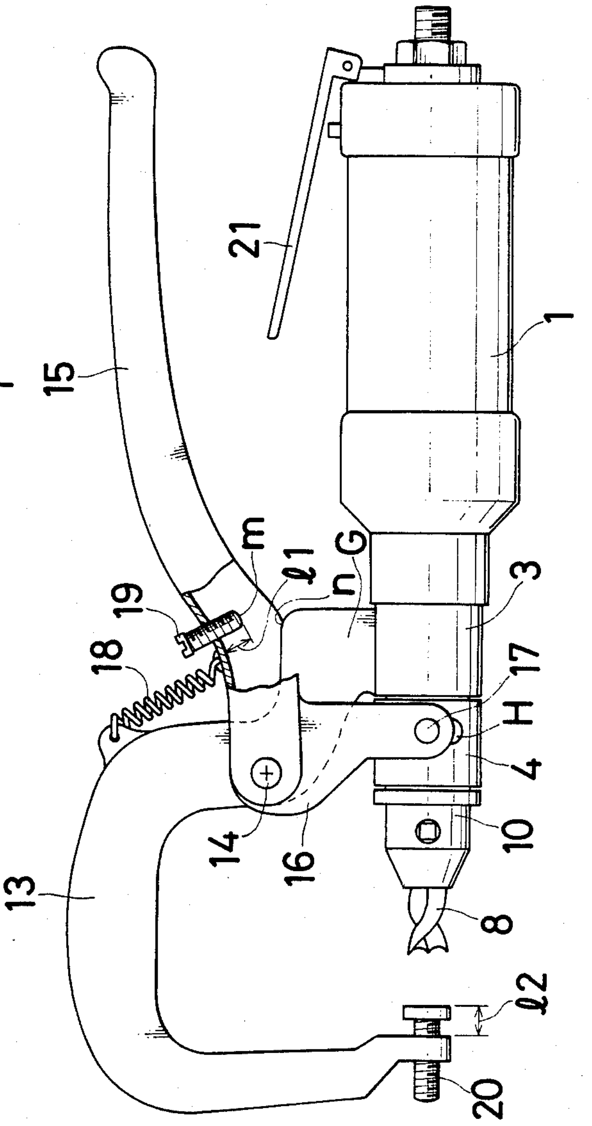
FIGS. 3 and 4 are side elevation views explanatory of functions of the device of FIG. 1.
Figure 2:
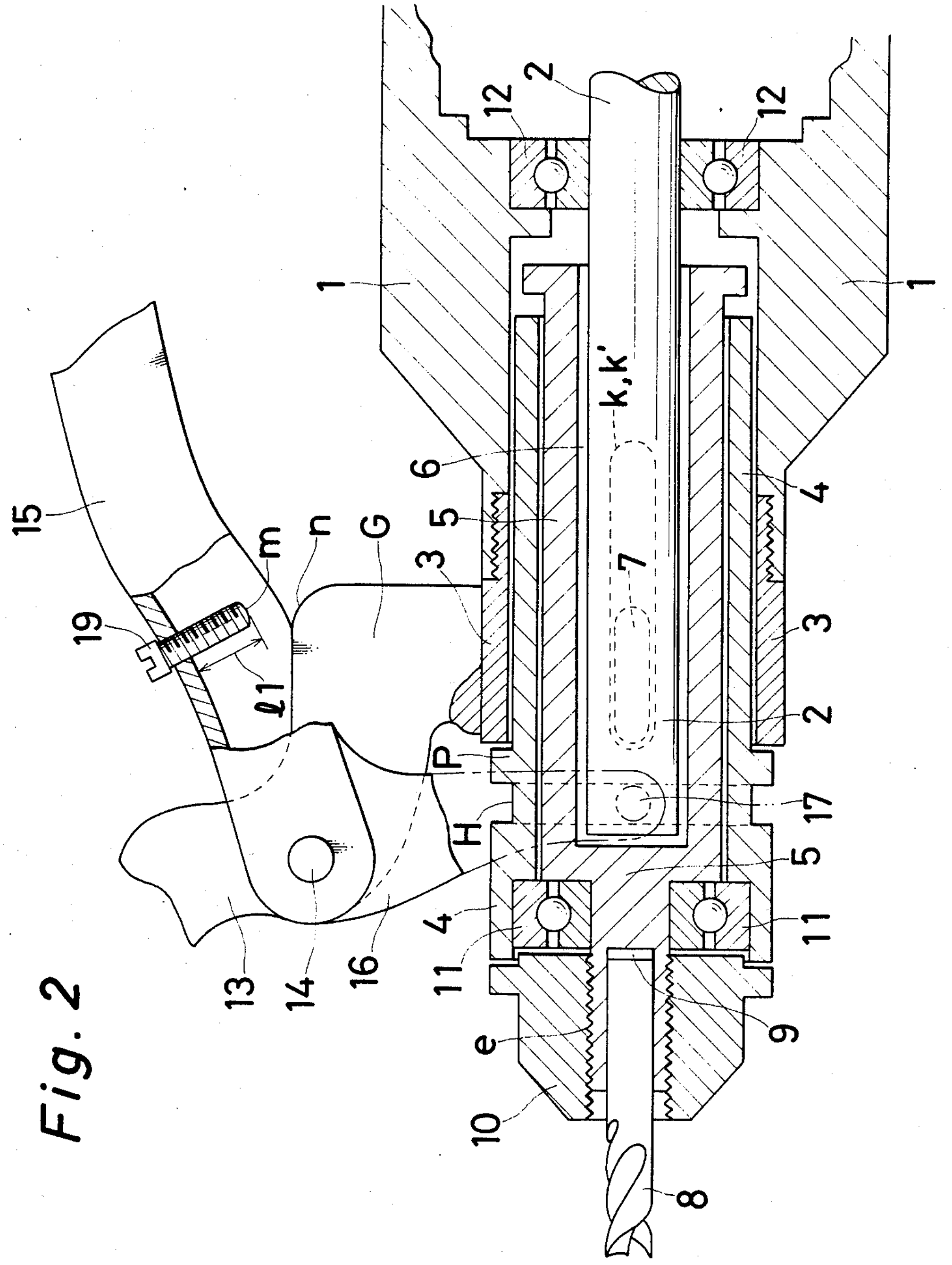
FIG. 2 is a side elevational view partly in section showing on an enlarged scale, the drilling device of FIG. 1.
Figure 4:
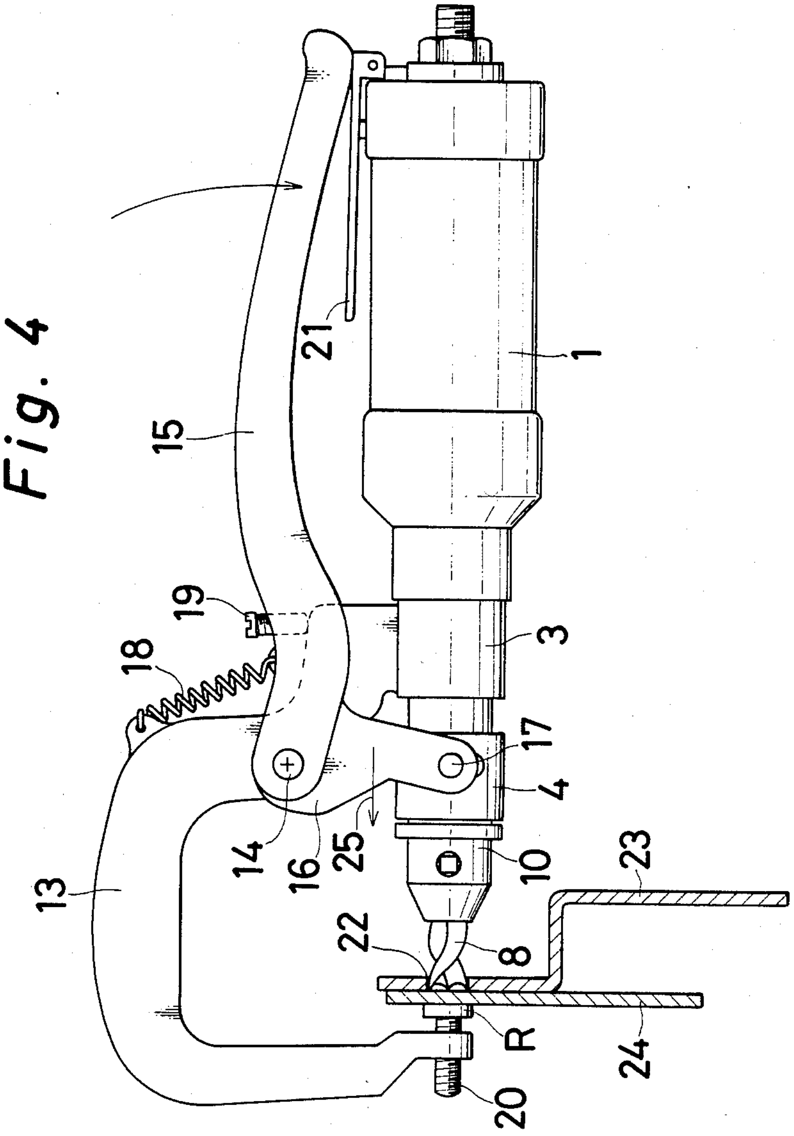

Referring now to the drawings, there is shown, in FIGS. 1 through 4, a drilling device according to one preferred embodiment of the present invention, which generally includes a main body casing 1 for the device, a rotary shaft 2 of a spindle air motor, to be driven by compressed air supplied from an air compressor (not shown), which is incorporated in said casing 1, a chuck receiving holder 3 threadedly connected to a forward end of the main body casing 1, and a U-shaped arm 13 (to be described in more detail below) integrally fixed, at a base shoulder portion G thereof, to an end of chuck receiving holder 3.

The drilling device further includes a cylindrical chuck receiver 4 having a rear end portion said slidably fitted into said chuck receiving holder 3 and main body casing 1. On the other hand, the front end portion of the chuck receiver 4 is formed with a flange P for restricting the amount of such sliding movement, and also with an engaging groove H to be engaged with an engaging pin 17 of a chuck thrusting arm 16 to be described more in detail below.

A chuck 5 has a bore 6 axially formed centrally in a rear end portion thereof for receiving the rotary shaft 2. A slot k is formed in chuck 5 to extend over a predetermined distance in the longitudinal direction thereof. A similar slot k' is formed in rotary shaft 2. Accordingly, when the rotary shaft 2 is fitted into bore 6, slot k' confronts slot k, with a key 7 fitting into both of the slots, thus forming one unit and making it possible to transmit rotation of the rotary shaft 2 to the chuck 5 while enabling relative axial sliding movement therebetween. Meanwhile, in the forward end portion of the chuck 5, a bore 9 is formed for receiving a drill 8 therein, while a plurality of rows of split grooves are formed in the longitudinal direction along bore 9, with a male thread e being provided around the peripheral surface of the forward end portion of chuck 5. Thus, upon insertion of the drill 8 into the bore 9, the drill 8 is tightened and secured by threading onto threads e a socket 10. The drilling device is further provided with ball bearings 11 and 12 at its front and rear portions as is most clearly seen in FIG. 2.

On the other hand, at the base shoulder portion G of the U-shaped arm 13 fixed to the side of the chuck receiving holder 3, there is provided a pivot pin 14 around which a grip handle 15 is pivotally supported, and chuck thrusting arm 16 is integrally mounted at the forward end of the grip handle 15, while engaging pin 17 is provided at the lower end of arm 16 for engagement with the slit H of the chuck receiver 4.

The drilling device is further provided with a spring 18 for normally biasing the grip handle 15 in the opened state. A projection amount adjusting screw 19 is provided at an upper back portion of the grip handle 15. When the grip handle 15 is brought into a closed state against the force of the spring 18, the chuck receiver 4 is prevented from rotation to an extent more than necessary through contact of the lower end m of the screw 19 with an end n of the base shoulder portion of the U-shaped arm 13. In the above operating procedure, the chuck thrusting arm 16 causes the chuck receiver 4 to be projected outwardly of casing 1 and holder 3, together with the chuck 5, in a direction indicated by arrow 25 in FIG. 4. The amount of such projection may be readily altered by properly adjusting a thread length $l_1$ of adjusting screw 19.

On the other hand, there is also provided a plate thickness adjusting screw 20 which is threaded into the forward end of the U-shaped arm 13 so as to confront a tip of the drill, and is preliminarily adjusted, with regard to the distance $l_2$ up to a head R thereof, to a necessary predetermined length. In the above case, in accordance with the amount of projection of the chuck receiver 4 described earlier, the setting of the cut-in depth by the drill 8, during the removal of spot-welded portions to be described later and the thickness of the remaining plate following the cut-in, may be effected freely as desired.

At the rear end portion of the drilling device, there is provided a lever 21 for opening and closing a valve which is arranged to be depressed upon closure of the grip handle 15, so as to rotate the spindle motor accommodated within the main body casing 1 for consequent rotation of the drill 8. Upon releasing of the lever 21 from the depressed position by opening the grip handle 15, the spindle motor and the drill are automatically stopped.

The drilling device according to the present invention has the constructions as described in the foregoing, and for actual use, thickness of the plate to be processed is preliminarily measured to properly adjust both the projecting amount adjusting screw 19 and the plate thickness adjusting screw 20 in advance according to the thickness of the plate thus measured. After completion of the above procedure, the device is applied to a spot-welded portion 22 (FIG. 4) by lightly holding the grip handle 15, and as the grip handle 15 is gripped more strongly, the chuck 5 advances in the direction of the arrow 25, while simultaneously the lever 21 is depressed so that the drill 8 starts cutting into a plate 23 to be separated while being rotated. In the above case, upon contact of the lower end m of the projection amount adjusting screw 19 with the end n of the base shoulder portion of the U-shaped arm 13 during the above cutting-in operation, further projection and cutting-in are prevented. Thus, the drill 8 is rotated in a fixed position, and damage to the other plate 24 not required to be separated may be perfectly prevented (see FIG. 4). It should be further noted that, according to the drilling device of the present invention, not only the position to be drilled is correctly grasped by the employment of the U-shaped arm 13, but also the cutting edge of the drill is stable without slipping, thus resulting in a prolonged service life of the drill.

The invention may be embodied in other specific forms without departing from the spirit or essential characteristics thereof. The present embodiment therefore is to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A drilling device for removing a spot-welded portion, said device comprising:

a main body casing having a forward end;

a chuck receiving holder fixed rigidly to said forward end of said main body casing;

a U-shaped arm having a first end fixed to a side portion of said chuck receiving holder, a base shoulder portion adjacent said first end, and a free second end spaced forwardly of said forward end of said main body casing;

a chuck receiver extending into said forward end of said main body casing and axially slidable with respect thereto, said chuck receiver having extending therefrom a flange for abutment with said chuck receiving holder, thereby to restrict axial movement of said chuck receiver into said main body casing, said chuck receiver having formed therein an engaging groove;

a chuck received within said chuck receiver and axially slidable therewith, said chuck having formed in a forward end portion thereof an axial bore, said chuck having therein longitudinal split grooves, and said chuck having therearound external threads;

a drill extending into said axial bore in said forward end of said chuck and directed toward said free second end of said U-shaped arm;

socket means having internal threads and threaded over said chuck for tightening said chuck onto said drill;

means for rotating said chuck with respect to said chuck receiver and said main body casing, and thereby for rotating said drill, said rotating means comprising a rotary shaft extending into said chuck and adapted to be rotated by a motor mounted in said main body casing, and means for connecting said rotary shaft and said chuck to prevent relative rotation therebetween while enabling relative axial movement therebetween;

first bearing means between said main body casing and said rotating means to enable relative rotation therebetween;

second bearing means between said chuck and said chuck receiver to enable relative rotation therebetween;

means for moving said chuck receiver, said chuck and said drill axially of said main body casing toward said free second end of said U-shaped arm, said moving means comprising a grip handle pivotally mounted on said base shoulder portion for movement between a first position relatively spaced from said main body casing and a second position relatively toward said main body casing, and a chuck thrusting arm integrally connected to said grip handle and having a pin fitting in said engaging groove and thereby engaging said chuck receiver such that, upon movement of said grip handle from said first position thereof toward said second position thereof, said chuck thrusting arm moves said chuck receiver, and thereby said chuck and said drill, axially with respect to said main body casing and said rotating means toward said free second end of said U-shaped arm;

means for adjustably restricting the length of said axial movement, said restricting means comprising a screw mounted on said grip handle and having an end abutting a surface of said base shoulder portion when said grip handle is in said second position thereof, said screw being mounted to adjust the relative position of said abutting end with respect to said base shoulder portion; and means on said main body casing for operating the motor for rotating said rotary shaft, and a lever pivotally mounted on said main body casing for movement between a first position spaced from said operating means and a second position actuating said operating means, said lever being positioned such that movement of said grip handle to said second position thereof moves said lever to said second position thereof, thereby rotating said rotary shaft.

2. A device as claimed in claim 1, further comprising a screw adjustably fixed to said free second end of said U-shaped arm for accommodating varying thicknesses of plates to be positioned between said free second end and said drill.

3. A device as claimed in claim 1, wherein said connecting means comprises confronting axial slots in said rotary shaft and said chuck, and a key engaging said slots and having an axial length less than said slots.

4. A device as claimed in claim 1, wherein said operating means comprises a valve to be connected to an air compressor, and said lever in said second position thereof closes said valve.

* * * * *